(12) United States Patent
Liu

(10) Patent No.: US 10,948,788 B2
(45) Date of Patent: Mar. 16, 2021

(54) MULTI-COLOR SMART PDLC FILM AND IN-VEHICLE SMART FILM STRUCTURE

(71) Applicant: WING TAK LEE SILICONE RUBBER TECHNOLOGY (SHENZHEN) CO., LTD, Guangdong (CN)

(72) Inventor: Tak Nam Liu, Guangdong (CN)

(73) Assignee: WING TAK LEE SILICONE RUBBER TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/382,234

(22) Filed: Apr. 12, 2019

(65) Prior Publication Data

US 2020/0225523 A1    Jul. 16, 2020

(30) Foreign Application Priority Data

Jan. 10, 2019  (CN) .......................... 201910023503.3

(51) Int. Cl.
| | |
|---|---|
| *G02F 1/1345* | (2006.01) |
| *G02F 1/1334* | (2006.01) |
| *G02F 1/13* | (2006.01) |
| *B60J 3/04* | (2006.01) |

(52) U.S. Cl.
CPC ........ *G02F 1/13452* (2013.01); *G02F 1/1313* (2013.01); *G02F 1/1334* (2013.01); *B60J 3/04* (2013.01); *G02F 2201/50* (2013.01)

(58) Field of Classification Search
CPC .............. G02F 1/1334; G02F 1/13452; G02F 2201/50; G02F 1/1313
See application file for complete search history.

(56) References Cited

U.S. PATENT DOCUMENTS

| | | | | |
|---|---|---|---|---|
| 8,378,927 | B2* | 2/2013 | Lee ........................ | G09G 3/38 345/105 |
| 2013/0278989 | A1* | 10/2013 | Lam ...................... | G02C 7/101 359/275 |
| 2017/0153467 | A1* | 6/2017 | Chang .................... | G02F 1/137 |
| 2018/0252979 | A1* | 9/2018 | Park ...................... | G02F 1/1514 |
| 2019/0346733 | A1* | 11/2019 | Holt .................... | H02M 3/1582 |
| 2020/0017364 | A1* | 1/2020 | Li ........................ | C01G 17/006 |

* cited by examiner

*Primary Examiner* — Dung T Nguyen

(57) ABSTRACT

The present application provides a multi-color smart Polymer Dispersed Liquid Crystal (PDLC) film and an in-vehicle smart film structure, wherein the PDLC film comprises a protective film, a front conductive film, a back conductive film, an intermediate member and a control circuit; the inner side surface of the front conductive film is adhered and fixed to the front surface of the intermediate member, the inner side surface of the back conductive film is adhered and fixed to the back surface of the intermediate member, two ports of the control circuit are electrically connected to the front conductive film and the back conductive film, respectively, the control circuit is configured to control whether the front conductive film and the back conductive film are conductive.

2 Claims, 3 Drawing Sheets

MULTI-COLOR SMART PDLC FILM AND IN-VEHICLE SMART FILM STRUCTURE

CROSS-REFERENCE TO PRIOR APPLICATION

This application claims the benefit of Chinese Patent Application No. 201910023503.3 filed on Jan. 10, 2019, the contents of which are incorporated herein by reference.

TECHNICAL FIELD

The present application relates to the fields of building technology and automobile technology, and in particular to a multi-color smart switchable transparent film and an in-vehicle smart film structure.

BACKGROUND

An auto film is a film-like object attached to the front and rear windshields, side windshields and skylights of a vehicle. The film-like object is also referred to as a solar film or a heat-insulating film, which is mainly used to block UV rays, block part of the heat, prevent the injury caused by glass splash, and prevent glare and so on.

An architectural film is a film attached to the glass surface of a building, which can make the glass have a special effect.

The auto film and the architectural film are mainly attached to the glass. The glass sometimes needs to have good light transmission and sometimes needs to have good shielding property. The existing film cannot meet its requirements and is poor in user experience.

SUMMARY

The embodiments of the present application provide a multi-color smart switchable transparent (also known as Polymer Dispersed Liquid Crystal, PDLC) film and an in-vehicle smart film structure. The smart film has the advantages of realizing the requirements of light transmission and shielding property and improving the user experience.

The first embodiment of the present application provides a multi-color smart PDLC film, wherein the smart film comprises a protective film, a front conductive film, a back conductive film, an intermediate member and a control circuit;

the inner side surface of the front conductive film is adhered and fixed to the front surface of the intermediate member, the inner side surface of the back conductive film is adhered and fixed to the back surface of the intermediate member, two ports of the control circuit are electrically connected to the front conductive film and the back conductive film, respectively, the control circuit is configured to control whether the front conductive film and the back conductive film are conductive; the protective film is adhered and fixed to the outer side surface of the front conductive film or the outer side surface of the back conductive film; and the intermediate member has molecules orderly arranged when there is an electric field and has molecules disorderly arranged when there is no electric field.

Preferably, the intermediate member comprises a liquid crystal body and a polymer filling material.

Preferably, the control circuit comprises a microprocessor, a communication port, a control switch and a power source;

the microprocessor is connected to the communication port, and the microprocessor is configured to control whether the control switch is conductive according to a signal of the communication port;

the power source supplies power to the control circuit, the positive electrode of the power source is connected to the front conductive film, the negative electrode thereof is connected to one end of the control switch while the other end of the control switch is connected to the back conductive film, and the control port of the control switch is connected to a General-Purpose Input/Output (GPIO) interface of the microprocessor.

The second embodiment of the present application provides an in-vehicle smart film structure, wherein the structure comprises a plurality of smart windows, a control unit, a one-way multi-channel switch and a power interface, wherein the control unit controls the ON/OFF of the one-way multi-channel switch, the power interface is connected with the in-vehicle power supply, the positive electrode of the power interface is connected with the P port of the one-way multi-channel switch while the T port of the one-way multi-channel switch is connected with the front conductive film of each smart window, respectively, the negative electrode of the power interface is connected with the back conductive film of each of the smart windows, and each of the smart windows comprises a front conductive film, a back conductive film and an intermediate member;

the inner side surface of the front conductive film is adhered and fixed to the front surface of the intermediate member, the inner side surface of the back conductive film is adhered and fixed to the back surface of the intermediate member, and the intermediate member has molecules orderly arranged when there is an electric field and has molecules disorderly arranged when there is no electric field;

wherein the smart window further comprises a protective film attached to the outer side surface of the front conductive film or the outer side surface of the back conductive film;

the protective film comprises a protective layer;

the mass percentage of the protective layer is as follows:

toluene accounts for 5%, titanium dioxide accounts for 10%, maleic acid alkyd resin accounts for 15%, acetone accounts for 10%, and liquid nano-tungsten oxide accounts for the remaining amount;

the total mass percentage of the above components is 100%.

Preferably, the protective film comprises a glue layer, a PET film, wherein the glue layer is provided on the outer side surface of the front conductive film.

The embodiments of the present application have the following beneficial effects:

it can be seen that the present application controls the control circuit to be energized, the liquid crystal has molecules orderly arranged. At this time, the light directly passes through the entire intermediate member, having good light transmission. If the control circuit is not energized, the liquid crystal body has molecules disorderly arranged. At this time, when passing through the liquid crystal body, the light will refract, and the light will scatter so as to achieve the purpose of opacity, thus improving the user experience.

BRIEF DESCRIPTION OF THE DRAWINGS

In order to more clearly illustrate the technical solutions in the embodiments of the present application, the drawings used in the description of the embodiments will be briefly described below. Obviously, the drawings in the following description are some embodiments of the present application. Those skilled in the art can also obtain other drawings based on these drawings without any creative efforts.

DESCRIPTION OF THE EMBODIMENTS

The technical solution in the embodiments of the present application is clearly and completely described below with reference to the accompanying drawings in the embodiments of the present application. Obviously, the described embodiments are a part of the embodiments of the present application, rather than all of the embodiments. All other embodiments obtained by those skilled in the art based on the embodiments of the present application without any creative efforts are within the scope of protection of the present application.

The terms, such as "first", "second", "third" and "fourth" etc., in the specification and claims of the present application and the accompanying drawings are used to distinguish different objects, and are not intended to describe a specific order. Furthermore, the terms "comprise" and "have" and any variations thereof are intended to cover a non-exclusive inclusion. For example, a process, method, system, product, or device that comprises a series of steps or units is not limited to the listed steps or units, but optionally comprises steps or units that are not listed, or optionally comprises other steps or units inherent to these processes, methods, products or devices.

References to "an embodiment" herein mean that a particular feature, result, or characteristic described in connection with the embodiments can be included in at least one embodiment of the present application. The appearances of the phrase in various places in the specification are not necessarily referring to the same embodiments, and are not exclusive or alternative embodiments that are mutually exclusive from other embodiments. Those skilled in the art will explicitly and implicitly understand that the embodiments described herein can be combined with other embodiments.

An auto film and an architectural film have a certain effect. In the office, for example, when meeting in the office, it requires the office to maintain a certain privacy, which requires the office glass to be opaque. When working normally in the office, it requires that it is easy for people outside to see if there is anyone in the office, so the glass should keep transparent. The existing glass cannot realize this. Therefore, a smart transparent film is needed to meet the requirements. The same is true for automobiles. When an automobile is driving, the automobile glass is required to have good light transmission. When an automobile is not driving, the shielding property of the automobile glass is required to be as good as possible, that is, the light transmission thereof is as poor as possible.

Figure 1:
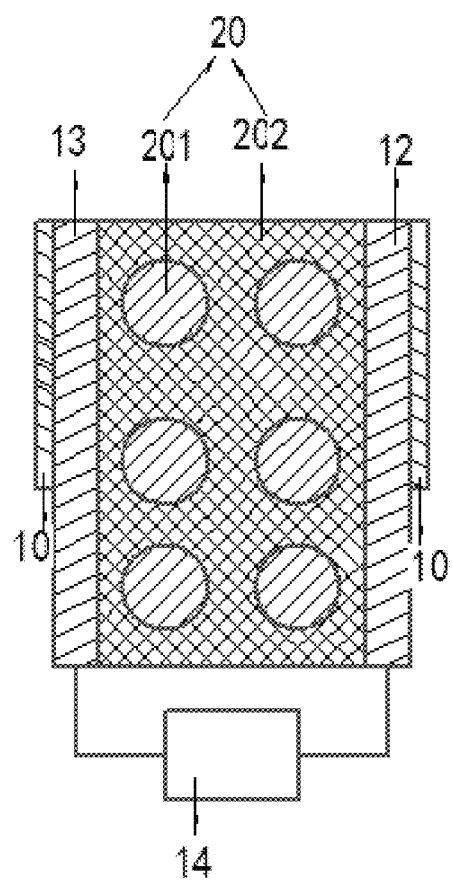
FIG. 1 is a schematic structural diagram of a smart film according to the present application.

Referring to FIG. 1, FIG. 1 provides a multi-color smart PDLC film. The smart film comprises a protective film 10, a front conductive film 12, a back conductive film 13, an intermediate member 20 and a control circuit 14;

the inner side surface of the front conductive film 12 is adhered and fixed to the front surface of the intermediate member, the inner side surface of the back conductive film 13 is adhered and fixed to the back surface of the intermediate member 20, two ports of the control circuit 14 are electrically connected to the front conductive film 12 and the back conductive film 13, respectively, the control circuit 14 is configured to control whether the front conductive film 12 and the back conductive film 13 are conductive; the protective film 10 is adhered and fixed to the outer side surface of the front conductive film 12 or the outer side surface of the back conductive film 13; and the intermediate member has molecules orderly arranged when there is an electric field and has molecules disorderly arranged when there is no electric field.

Preferably, the intermediate member may specifically comprise a material formed in such a way that a liquid crystal body 201 and a polymer filling material 202 are mixed. The above liquid crystal body may be specifically a liquid crystal display screen material, and the above polymer material may be a light-transmitting polymer material. The above liquid crystal body may be specifically a liquid crystal material having molecules orderly arranged when there is an electric field and having molecules disorderly arranged when there is no electric field, such as an orientation layer of the liquid crystal display screen.

Figure 2A:
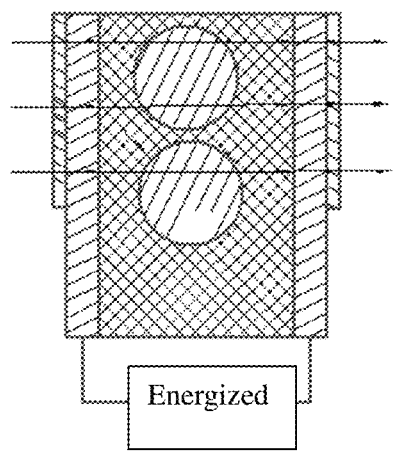
FIG. 2a is a schematic diagram of energized light of a smart film according to the present application.
Figure 2B:
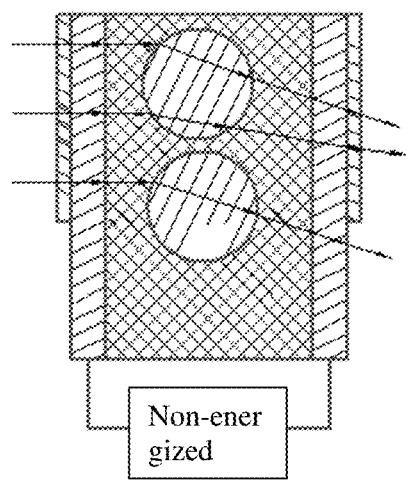
FIG. 2b is a schematic diagram of non-energized light of a smart film according to the present application.

Referring to FIG. 2a, FIG. 2a is a light transmission schematic diagram of the structure shown in FIG. 1 according to the present application. Referring to FIG. 2b, FIG. 2b is a non-light transmission schematic diagram of the structure shown in FIG. 1 according to the present application. As shown in FIG. 2a, if the control circuit 14 is energized, the liquid crystal body has molecules orderly arranged. At this time, the light directly passes through the entire intermediate member, having good light transmission. If the control circuit is not energized, the liquid crystal body has molecules disorderly arranged. At this time, when passing through the liquid crystal body, the light will refract. As shown in FIG. 2b, the light will scatter so as to achieve the purpose of opacity.

Figure 3:
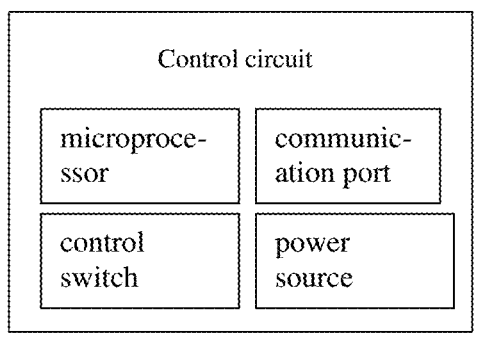
FIG. 3 is a schematic structural diagram of a control circuit according to the present application.

Preferably, as shown in FIG. 3, the above control circuit 14 may specifically comprise a microprocessor, a communication port, a control switch and a power source.

The power source may be a fixed power source or an external power interface, for example, in a vehicle, and may be a power interface of an external in-vehicle battery.

The microprocessor is connected to the communication port, and the microprocessor is configured to control whether the control switch is conductive according to a signal of the communication port.

The power source supplies power to the control circuit, the positive electrode of the power source is connected to the front conductive film 12, the negative electrode thereof is connected to one end of the control switch while the other end of the control switch is connected to the back conductive film, and the control port of the control switch is connected to a GPIO interface of the microprocessor (also called MCU). The MCU can use an ordinary MCU, such as MCUs of STM32 series. Certainly, other MCUs can also be used, such as MCUs of MCS-51 or MCS-61 series.

Preferably, the control switch may be a triode, and the control port may be a base of the triode. The emitter of the triode is one end of the control switch, and the collector is the other end of the control switch.

Figure 4:
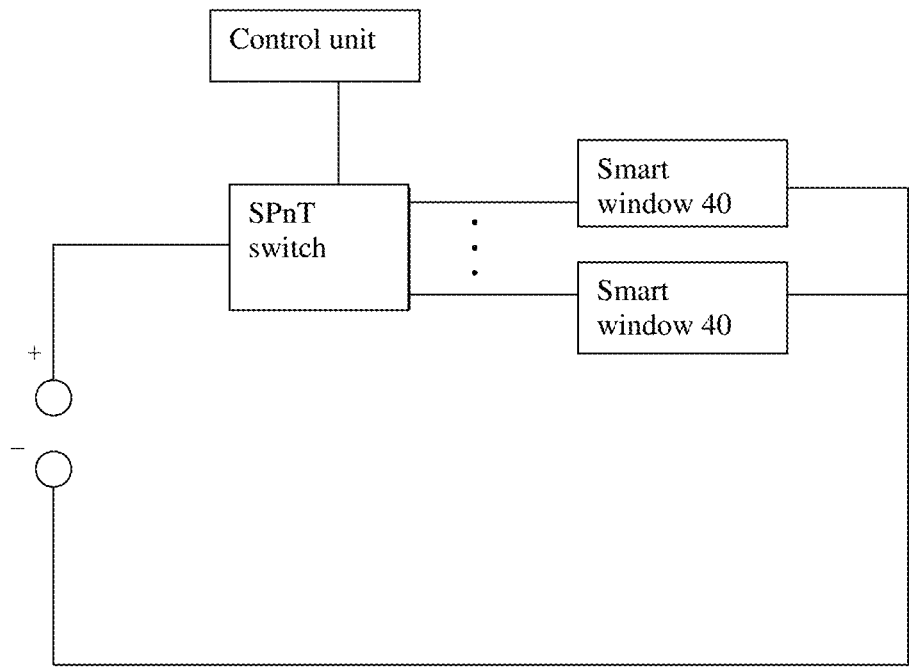
FIG. 4 is a schematic structural diagram of an in-vehicle smart film structure according to the present application.

Referring to FIG. 4, FIG. 4 provides an in-vehicle smart film structure, wherein the structure comprises a plurality of smart windows, a control unit (such as an MCU or a central processor), a one-way multi-channel switch (SPnT) and a power interface, wherein the control unit controls the ON/OFF of the one-way multi-channel switch, the power interface is connected with the in-vehicle power supply, the positive electrode of the power interface is connected with the P port of the one-way multi-channel switch while the T port of the one-way multi-channel switch is connected with the front conductive film of each smart window, respectively, the negative electrode of the power interface is connected with the back conductive film of each of the smart windows, and each of the smart windows 40 comprises a front conductive film, a back conductive film and an intermediate member.

The inner side surface of the front conductive film is adhered and fixed to the front surface of the intermediate member, the inner side surface of the back conductive film is adhered and fixed to the back surface of the intermediate member, and the intermediate member has molecules orderly arranged when there is an electric field and has molecules disorderly arranged when there is no electric field.

Preferably, each of the smart windows further comprises a protective film attached to the outer side surface of the front conductive film.

Figure 5:
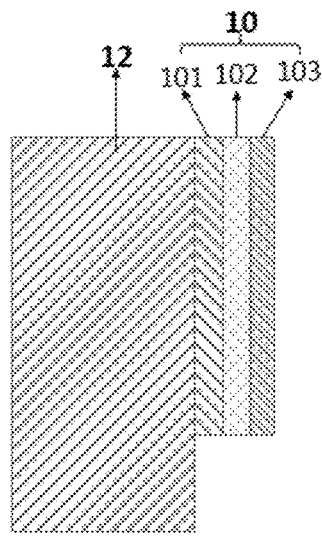
FIG. 5 is a schematic structural diagram of a protective film according to the present application.

Referring to FIG. 5, the protective film 10 comprises a glue layer 101, a PET film 102 and a protective layer 103, wherein the glue layer 101 is provided on the outer side surface of the front conductive film 12.

The protective layer comprises the components of mass percentage as follows (the total mass percentage of the components is 100%):

toluene accounts for 5%, titanium dioxide accounts for 10%, maleic acid alkyd resin accounts for 15%, acetone accounts for 10%, and liquid nano-tungsten oxide accounts for the remaining amount.

The protective layer is added with titanium dioxide and liquid nano-tungsten oxide, which can effectively prevent heat. Certainly, the above protective layer can also be used in the smart film as shown in FIG. 1.

In the above embodiments, the description of each of the embodiments has its own emphasis, and the parts that are not detailed in a certain embodiment can refer to the related descriptions of other embodiments.

In the several embodiments provided by the present application, it should be understood that the disclosed device may be implemented in other ways. For example, the device embodiments described above are merely illustrative. For example, the division of the unit is only a logical function division. In actual implementation, there may be another division manner. For example, a plurality of units or components may be combined or may be integrated into another system, or some features may be ignored or not executed. In addition, the mutual coupling, direct coupling or communication connection shown or discussed may be an indirect coupling or communication connection through some interfaces, devices or units, and may be electrical or in other forms.

In addition, each of the functional units in each of the embodiments of the present application may be integrated into one processing unit, or each of the units may exist physically separately, or two or more of the units may be integrated into one unit. The above integrated unit may be implemented in the form of hardware or in the form of a software program module.

The embodiments of the present application have been described in detail above. Specific examples are applied herein to set forth the principles and implementations of the present application. The description of the above embodiments is only used to help understand the method and core ideas of the present application; at the same time, those skilled in the art will have a change in the specific embodiments and the scope of application according to the idea of the present application. In summary, the content of the present specification should not be construed as limiting the present application.

What is claimed is:

1. An in-vehicle smart film structure, wherein the structure comprises a plurality of smart windows, a control unit, a one-way multi-channel switch and a power interface, wherein the control unit controls the ON/OFF of the one-way multi-channel switch, the power interface is connected with the in-vehicle power supply, the positive electrode of the power interface is connected with the P port of the one-way multi-channel switch while the T port of the one-way multi-channel switch is connected with the front conductive film of each smart window, respectively, the negative electrode of the power interface is connected with the back conductive film of each of the smart windows, and each of the smart windows comprises a front conductive film, a back conductive film and an intermediate member;

the inner side surface of the front conductive film is adhered and fixed to the front surface of the intermediate member, the inner side surface of the back conductive film is adhered and fixed to the back surface of the intermediate member, and the intermediate member has molecules orderly arranged when there is an electric field and has molecules disorderly arranged when there is no electric field;

wherein the smart window further comprises a protective film attached to the outer side surface of the front conductive film or the outer side surface of the back conductive film;

the protective film comprises a protective layer;

the mass percentage of the protective layer is as follows:

toluene accounts for 5%, titanium dioxide accounts for 10%, maleic acid alkyd resin accounts for 15%, acetone accounts for 10%, and liquid nano-tungsten oxide accounts for the remaining amount;

the total mass percentage of the above components is 100%.

2. The in-vehicle smart film structure of claim 1, wherein the protective film comprises a glue layer, a PET film, wherein the glue layer is provided on the outer side surface of the front conductive film.

* * * * *